United States Patent
Asai

[11] 3,857,842
[45] Dec. 31, 1974

[54] PROCESS FOR PREPARING PURINE COMPOUNDS BY REACTION OF A CARBONITRILE WITH FORMIC ACID

[75] Inventor: Norio Asai, Chiba, Japan

[73] Assignee: Sagami Chemical Research Center, Tokyo, Japan

[22] Filed: Dec. 7, 1971

[21] Appl. No.: 205,764

[30] Foreign Application Priority Data
May 6, 1970 Japan................................ 45-38504
Dec. 9, 1970 Japan............................ 45-108579
Dec. 9, 1970 Japan............................ 45-108578

[52] U.S. Cl................................ 260/252, 260/309
[51] Int. Cl............................................ C07d 57/38
[58] Field of Search .................................... 260/252

[56] References Cited
FOREIGN PATENTS OR APPLICATIONS
1,134,974 Great Britain...................... 260/252

OTHER PUBLICATIONS
Wagner and Zook, "Synthetic Organic Chemistry," John Wiley & Sons, 1953, p. 567 relied on.

Primary Examiner—Richard J. Gallagher
Assistant Examiner—Anne Marie T. Tighe
Attorney, Agent, or Firm—Sughrue, Rothwell, Mion, Zinn & Macpeak

[57] ABSTRACT

An improved process for preparing purine compounds of the formula

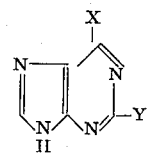

wherein X is selected from the group consisting of an amino and a hydroxy group, and Y is selected from the group consisting of an amino and a hydroxy group and hydrogen, which are useful as precursors for the synthesis of organic compounds, as well as a process for preparing a carboxyamide of the formula

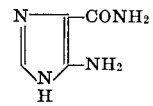

useful as an intermediate for the synthesis of the above purine compounds are disclosed. These processes start with 4(5)-aminoimidazole-5(4)-carbonitrile of the formula

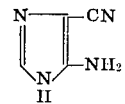

4 Claims, No Drawings

PROCESS FOR PREPARING PURINE COMPOUNDS BY REACTION OF A CARBONITRILE WITH FORMIC ACID

This invention relates to a process for preparing purine compounds. More particularly, this invention relates to a process for preparing purine compounds of the formula

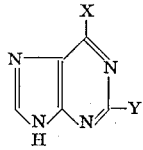

wherein X is selected from the group consisting of amino (—NH₂) and hydroxy, and Y is selected from the group consisting of amino(—NH₂), hydroxy and hydrogen; and 4(5)-aminoimidazole-5(4)-carboxyamide (this term includes both 4-aminoimidazole-5-carboxyamide and 5-aminoimidazole-4-carboxyamide and is hereinafter referred to as "AICA") of the formula

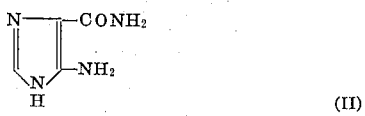

The starting material for preparing the compounds of the formulae (I) and (II) in accordance with the process of this invention is 4(5)-aminoimidazole-5(4)-carbonitrile of the formula

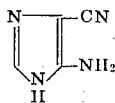

which includes both 4-aminoimidazole-5-carbonitrile and 5-aminoimidazole-4-carbonitrile and is hereinafter referred to as "AICN."

The product purine compounds of the present invention having the formula (I) include guanine, isoguanine, diaminopurine, xanthine, hypoxanthine and adenine which are useful for the preparation of pharmaceuticals. For example, guanine and isoguanine themselves are known to be a precursor of nucleic acids, and diaminopurine and a methyl derivative of xanthine are used for pharmaceuticals as caffeine, theophylline and theobromine. Also, hypoxanthine is an essential material for inosinic acid as a condiment.

This invention also relates to a process for preparing AICA which is an intermediate obtained in the synthesis of certain purine compounds. This compound is known to be useful as an additive in the fermentation of microorganisms and to have a specific effect in the treatment of liver function disorders.

Thus, the products obtained in accordance with the process of this invention have great utility and are extremely valuable in industry. Some processes for preparing the above compounds have been reported, but each of the known processes is disadvantageous, either because the starting materials are not readily available or the practical operation is difficult to carry out, and therefore is not satisfactory to the production of the compounds on an industrial scale.

For example, the well-known processes for the synthesis of AICA which start with a compound other than AICN include a process comprising the catalytic reduction of 4-nitroimidazole-5-carboxyamide (Ber. 56 683 (1923)); a process comprising the reaction between 2-amino-2-amidinoacetic acid amide dihydrochloride and an orthoformic acid ester (Japanese Patent Publication No. 20550/1965); and a process comprising the reductive cyclization of phenylazomalonamidine in formic acid [Journal of Organic Chemistry, 24 256 (1959)], but each of the above known processes has disadvantages in industry in that synthesis of the starting material is complicated and, further, they yield of the desired product AICA is low. In addition, the publication which discloses the preparation of AICA from AICN as a starting material includes Japanese Patent Publication No. 42-6911/1967. In accordance with the process disclosed in Japanese Patent Publication No. 42-6911/1967, the desired product is obtained by heating a solution of AICN in an aqueous alkali hydroxide in a pressure-resistant sealed tube at a temperature of from 100° to 150°C for several hours to allow the reaction to proceed and thereafter the resulting crude product is isolated by ion exchange and neutralization technics followed by decoloration and purification with activated carbon. However, the latter process would not be an economical procedure in industry because the reaction must be conducted at relatively high temperatures for a considerably long period of time in a pressure-resistant reactor, it requires complicated procedures in the isolation and purification of the product, and it does not permit the recycling and re-use of the reaction solution. Further, the conventional processes include the preparation of adenine or hypoxanthine by the reaction of AICN with potassium cyanate or cyanic acid [R. A. Sanchez et al, J. Mol. Biol., 38, 121-128 (1968)]. This process, however, requires an extremely long reaction time and the yield of the product is as low as several percent and, therefore, has many disadvantages in production on an industrial scale. Further, the process for preparing xanthine or guanine by the reaction of ATCN or AICA with urea [R. A. Sanchez et al, J. Mol. Biol., 38, 121 (1968)] also has many disadvantages such as low yield of the product and is not suitable for industrial production.

The object of this invention is therefore to provide an improved process for preparing AICA and purine compounds which does not have the disadvantages associated with the conventional processes.

Another object of this invention is to provide a process for preparing AICA and purine compounds which can be carried out under mild conditions and which permits the use of expedient treatment and purification procedures following the reaction.

A further object of this invention is to provide a process for preparing AICA and purine compounds suitable for production on an industrial scale.

In accordance with the process of this invention, hypoxanthine, isoguanine, adenine and diaminopurine can be produced by using AICN as a starting material and reaching with a compound selected from the group consisting of formic acid, urea, guanine and ammonium formate. Also, in accordance with the process of this invention, guanine or xanthine can be produced by reacting AICA, which is obtainable by hydrolysis of AICN with hydrochloric acid, with urea or guanidine.

The starting material AICN used in the present invention is a well-known substance and can easily be produced by procedures well known to those skilled in the art, for example, by reacting diaminomalenonitrile with an orthoester to produce 4,5-dicyanoimidazole which is then subjected to hydrolysis to obtain 4(5)-cyanoimidazole-5(4)-carboxyamide followed by Hofmann rearrangement.

In preparing purine compounds directly from AICN and formic acid, ammonium formate, urea or guanidine according to the process of this invention, the latter reactant may generally be used in a proportion of about 1 to 5 parts by weight per 1 part by weight of AICN. This reaction is a cyclization of AICN with a formic acid compound or a urea compound, and the reaction temperature and the reaction time are somewhat critical and should be adjusted within an appropriate range. There is a correlation between the reaction temperature and the reaction time, but generally a reaction temperature in the range of from about 80°C to about 170°C is operable, with the preferred temperature being in the range of from 100° to 150°C. Higher and lower temperatures may be used, but, at a reaction temperature below about 80°C, the reaction is unduly prolonged and adequate cyclization does not occur. At a reaction temperature above about 170°C, the starting materials tend to decompose thereby lowering the yield of the desired product.

In carrying out the reaction between AICN and formic acid, it is preferable to use as a reaction medium an inert organic solvent. Any organic solvent which does not adversely affect the reaction as well as the reactants and the product may be used, but the preferred solvent is xylene. It has been found that the reaction between AICN and ammonium formate proceeds adequately in the absence of a solvent, and that the reaction between AICN and urea or guanidine can also be conducted in the absence of a solvent and, preferably, in the heat-molten state.

Under the conditions described above, hypoxanthine, isoguanine, adenine and diaminopurine can be produced in more than 70% yield.

In carrying out the process for producing AICA from AICN, the starting material AICN is first heated in an aqueous conc. hydrochloric acid at a temperature of from room temperature to 150°C for a period of from about 5 to about 30 minutes and the resulting reaction mixture is allowed to cool to precipitate easily crystalline AICA hydrochloride. The thus obtained product can be filtered and washed with a solvent in which said hydrochloride is substantially insoluble, such as ethanol, to give highly purified AICA hydrochloride. If desired, highly purified free AICA can be obtained by neutralizing the corresponding hydrochloride with an alkali such as ammonia to yield a crude crystalline AICA which is then recrystallized from water. In this case, the free AICA can be obtained from the corresponding hydrochloride with approximately 100% conversion.

The thus obtained AICA hydrochloride can be stored for a long period of time because of its high stability, and the isolated AICA hydrochloride may be converted to free AICA, if it is required, and may also be used as it is for the preparation of other compounds.

The basic reaction in the preparation of AICA hydrochloride is the hydrolysis of the carbonitrile group in AICN with hydrochloric acid, and, in order to ensure a satisfactory yield of AICA hydrochloride, the concentration of the starting material AICN, the reaction temperature and time, and the concentration of hydrochloric acid are adjusted to within an appropriate range. The reactant AICN may generally be used in the concentration of from 5 to 40% but, in order to ensure a satisfactory yield, the preferred concentration is 10 – 20%.

At a concentration higher than 20%, some of the crystalline AICN remains undissolved in an aqueous hydrochloride as the solvent and, at a concentration below 10%, the precipitation of the product AICA hydrochloride from the solvent becomes difficult because of its solubility in the solvent. There is a correlation between the reaction temperature and the reaction time. A reaction temperature of from room temperature to about 150°C is operable, but the range of preferred temperatures is from 50° to 108°C in order to ensure a satisfactory yield. At a temperature below 50°C, the reaction is unduly prolonged. At a temperature above 108°C, the reaction proceeds rapidly to complete within an extremely short period of time but the product tends to decompose to the corresponding carboxylic acid by suffering severe hydrolysis which occurs simultaneously. A hydrochloric acid concentration as low as 15% may be operable in this reaction, but a concentration higher than about 25% is preferred in order to ensure a satisfactory yield. A concentration lower than about 25% slows the reaction thereby necessitating a prolonged reaction period.

The fact to be especially noted is that AICA hydrochloride can be obtained in more than 90% yield in accordance with the process of this invention if the above-described reaction conditions are specifically adjusted to the hydrochloric acid concentration of 34 – 36%, the reaction temperature of 90° – 100°C and the reaction time of 10 – 20 minutes.

The significant advantages of the process of this invention will now be set forth. As previously described, the reaction of the process of this invention is carried out at relatively low temperature and is completed in a relatively short period of time and requires no separation means for the product, especially the use of ion exchange resin after the reaction is completed. The product may be separated by precipitation and filtration and purified in a simple manner. It is only necessary that the reactor be resistant to hydrochloric acid since the reaction mixture in the reactor contains hydrochloric acid and is free from oxidizing agents and reducing agents. The reactor need not be high-pressure resistant, but is preferably one having heat-resistance. Another advantage of the process of this invention is that, upon completion of the reaction, the reaction mixture can be recycled or re-used by first cooling to precipitate the product, which is subsequently filtered, then adding water and hydrogen chloride to the filtrate for use in recycling.

In carrying out the preparation of guanine and xanthine from the reaction between AICA and urea or guanidine, the starting materials are generally used in the proportion of about from 1 to 2 parts by weight of urea or guanidine per 1 part by weight of AICA, but it is preferable to use an excess of urea or guanidine. It is one of the features of this invention that the reaction between AICA and urea or guanidine is conducted in the absence of a solvent. The reaction is a cyclization of AICA with urea or guanidine, and it is critical to hold the reaction temperature and the reaction time within appropriate ranges. Again, there is a correlation between reaction temperature and reaction time. A reaction temperature of from about 80°C to 170°C is operable, but, in order to ensure a satisfactory yield, temperature of from 100° to 150°C is preferred. At a temperature below about 80°C, the reaction is unduly prolonged and adequate cyclization does not occur. In contrast, at a temperature exceeding about 170° C, the starting materials tend to decompose thereby lowering the yield of the desired product.

It will be apparent to those skilled in the art that the process disclosed herein is remarkably valuable for industry due to the fact that at present the starting material AICA is easily obtained at low cost since a relatively easy and inexpensive for synthesizing AICA from hydrogen cyanide has recently been established.

The process of this invention is further illustrated by the following examples, but they are not to be construed as limiting the scope of the present invention.

EXAMPLE 1

A mixture of 1.0 g of 4(5)-aminoimidazole-5(4)-carbonitrile and 3.0 ml of formic acid was heated in 50 ml of xylene to reflux for 6 hours. After completion of the reaction, the reaction mixture was concentrated to dryness, and 30 ml of water was added to the residue followed by concentration again to dryness. The residue was then recrystallized from water containing activated carbon to give 0.91 g (72.2% yield) of the product as colorless crystals. This product had a melting point above 300°C and was identified as hypoxanthine by infrared absorption spectral analysis.

EXAMPLE 2

1.5 g of ammonium formate was added to 1.0 g of 4(-5)-aminoimidazole-5(4)-carbonitrile, and the resulting mixture was heated at a temperature of from 140° to 150°C until the reaction mixture turned a yellow green color, i.e., for about 40 minutes. After being allowed to cool, about 50 ml of water was added to the reaction mixture to remove any soluble materials followed by filtration. The thus obtained yellow green solid was recrystallized from water containing activated carbon to give 1.04 g (83.3% yield) of the product as colorless crystals. The product had a melting point above 300°C and was identified as adenine by infrared absorption spectral analysis. The infrared absorption spectrum of the colorless crystals obtained by recrystallization of the product from dilute hydrochloric acid corresponded to that of adenine.

EXAMPLE 3

1.5 g of urea was added to 1.0 g of 4(5)-aminoimidazole-5(4)-carbonitrile, and the mixture was heated at a temperature of from 140° to 150°C for 30 minutes, during which time the whole reaction mixture turned into a yellow brown solid. The resulting solid was allowed to cool to room temperature, and about 50 ml of water was added to the solid to remove any water-soluble materials followed by filtering off the solid. The thus obtained brown solid was recrystallized from dilute sulfuric acid to give 1.39 g (100% yield) of colorless crystals. The resulting crystalline product had a melting point above 300°C and was identified as isoguanine sulfate dihydrate by infrared absorption spectral analysis.

EXAMPLE 4

2.0 g of guanidine was added to 1.0 g of 4(5)-aminoimidazole-5(4)-carbonitrile, and the mixture was heated at a temperature of from 100° to 120°C. The reaction proceeded with the evolution of gas, and the whole reaction mixture turned into a brown solid. After being heated for about 40 minutes, about 30 ml of water was added to the mixture which was then filtered to remove insoluble materials (melamine). The filtrate was made acidic with dilute sulfuric acid followed by the addition of about 200 ml of ethanol. The thus obtained yellow precipitate was filtered and recrystallized from dilute sulfuric acid to give 2.03 g of nearly colorless crystals. Yield, 88.3%. The resulting crystals had a melting point above 300°C and the product was identified as diaminopurine sulfate by infrared absorption spectral analysis.

EXAMPLE 5

5.0 ml of 30% hydrochloric acid and 0.50 g of AICN were charged into a 25 ml flask and heated at a temperature of 100°C for 10 minutes. After completion of the reaction, the reaction mixture was allowed to cool, and the precipitated colorless crystals were filtered, thoroughly washed with ethyl alcohol and dried. The thus obtained crystals had a melting point of 255.0°C. Yield, 0.69 g (91.7%).

Analysis: Calcd for $C_4H_6N_4O \cdot HCl$:
C, 29.55%; H, 4.34%, N, 34.46%
Found: C, 29.62%; H, 4.39%, N, 34.52%

EXAMPLE 6

According to the procedure described in Example 5, 0.50 g of AICN was added to 5.0 ml of hydrochloric acid having the concentrations indicated in Table I below, and the resulting mixtures were heated at a temperature of 100°C for 10 minutes. The reaction mixtures were worked up in the same manner as in Example 5 to give AICA hydrochloride which was then isolated and weighed to determine the yield of the product in each instance. The results are set forth in Table I.

Table I

| No. | Concentration of HCl | Yield |
|---|---|---|
| 1 | 25% | 50.5% |
| 2 | 30% | 80.5% |
| 3 | 32% | 87.6% |
| 4 | 34% | 90.3% |

The crystalline products obtained in this example showed a melting point in the range of from 254.5° to 255.0°C and were identified as AICA hydrochloride by infrared absorption spectral analysis and mass spectrography.

EXAMPLE 7

According to the procedure as described in Example 5, 0.50 g of AICN was added to 5.0 ml of 36% hydrochloric acid and the mixture was heated at a temperature of 100°C for various periods as indicated in Table II. The reaction mixture was worked up in the same manner as in Example 5 to isolate AICA hydrochloride which was then weighed to determine the yield of the product in each instance. The results are set forth in Table II.

Table II

| No. | Reaction Time (min.) | Yield |
| --- | --- | --- |
| 1 | 5 | 85.3% |
| B | 15 | 95.8% |
| 3 | 30 | 72.2% |

The crystalline products obtained in this example showed a melting point in the range of from 254.5°C to 255.0°C and were identified as AICA hydrochloride by infrared absorption spectral analysis and mass spectrography.

EXAMPLE 8

According to the procedure described in Example 5, 0.50 g of AICN was added to 5.0 ml of 36% hydrochloric acid at various temperatures as indicated in Table III below for a period of 10 minutes. The reaction mixture was then worked up in the same manner as in Example 5 to isolate AICA hydrochloride which was then weighed to determine the yield of the product in each instance. The results are shown in Table III.

Table III

| No. | Reaction Temperature | Yield |
| --- | --- | --- |
| 1 | 90°C | 90.2% |
| 2 | 80°C | 87.6% |
| 3 | 70°C | 83.0% |
| 4 | 60°C | 71.2% |

The crystalline products obtained in this example according to the procedure of Example 5 showed a melting point in the range of from 254.5°C to 255.0°C and were identified as AICA hydrochloride by infrared absorption spectral analysis and mass spectrography.

EXAMPLE 9

According to the procedure described in Example 5, 0.50 g of AICN was added to 2.5 ml of 36% hydrochloric acid and the mixture was heated at a temperature of 100°C for 10 minutes. The reaction mixture was then worked up in the same manner as Example 5 and the thus obtained AICA hydrochloride was dissolved in water followed by being adjusted to pH8 with a 6N aqueous ammonia. The resulting neutral solution was concentrated under reduced pressure, and the resulting crystals was recrystallized from water to obtain 0.50 g (85.7%) of the product having a decomposition point at 169.5°C. The analytical values of the crystals was as follows:

Analysis: Calcd for $C_4H_6N_4O$:
C, 38.09%; H, 48.0%; N, 44.43%
Found: C, 37.93%; H, 49.2%; N, 44.50%

EXAMPLE 10

According to the procedure described in Example 5, 0.50 g of AICN was added to 7.5 ml of 35% hydrochloric acid and the resulting mixture was heated at a temperature of 100°C for a period of 10 minutes. The reaction mixture was then worked up in the same manner as Example 9 to isolate the product AICA which was then weighed. Upon examination of the infrared absorption spectrum and the mass spectrography, the product was identified as AICA. The thus obtained crystalline product weighed 0.52 g (89.1% yield).

EXAMPLE 11

According to the procedure described in Example 5, 0.50 g of AICN was added to 5 ml of 36% hydrochloric acid followed by being heated at a temperature of 100°C for a period of 10 minutes. The reaction mixture was then worked up in the same manner as Example 5 to isolate the product AICA. Upon examination of the infrared absorption spectrum and the mass spectrography, the product was identified as AICA. The thus obtained crystalline product weighed 0.54 g (90.8% yield).

EXAMPLE 12

1.5 g of urea was added to 1.0 g of AICA prepared in the same manner as in Example 9, and the mixture was heated at a temperature of from 140° to 150°C for about 1 hour. The reaction mixture was then cooled to solidify and any soluble material in the solid was removed by addition of about 50 ml of water followed by filtration. The resulting blue-gray solid was dissolved in a dilute aqueous ammonia and the solution was treated with activated carbon and then concentrated to give 0.55 g of colorless crystals. Yield: 44.4%. The thus obtained crystalline product had a melting point above 300°C and was identified as xanthine by its infrared absorption spectrum.

EXAMPLE 13

1.5 g of guanidine was added to 1.0 g of AICA and the mixture was heated at a temperature of from 120° to 130°C. The reaction proceeded with evolution of gas and the heating was continued for about 15 minutes, i.e., until the whole reaction mixture turned into a brown solid. The reaction product was allowed to cool to room temperature and about 30 ml of water was added thereto followed by filtration to remove water-insoluble material (melamine), and the filtrate was poured into a column of ion exchange resin, Amberlite IR-120 (H-Type). After being washed with water, the column was eluted with an aqueous ammonia of approximately 3N. The eluate was then concentrated to dryness under reduced pressure to obtain a yellow solid. Recrystallization of the solid from dilute hydrochloric acid yielded 0.96 g (80.0% yield) of pale yellow crystals. The thus obtained crystalline product had a melting point above 300°C and was identified as guanine hydrochloride by infrared absorption spectral analysis.

What is claimed is:

1. A process for preparing purine compounds of the formula

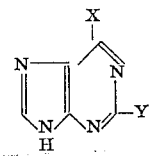

wherein X is selected from the group of hydroxy and amino, and Y is selected from the group consisting of hydrogen, hydroxy and amino, comprising the step of reacting at 80° to 170°C. 4(5)-aminoimidazole-5(4)-carbonitrile with a reagent selected from the group consisting of formic acid, ammonium formate, urea and guanidine.

2. A process according to claim 1, wherein said reaction is carried out at a temperature in the range of from 120° to 150°C.

3. A process for preparing adenine comprising the step of:
reacting 4(5)-aminoimidazole-5(4)-carbonitrile with ammonium formate at 80° to 170°C in the absence of a solvent and subsequently,
separating said isolated adenine from the reaction mixture.

4. The process of claim 3 wherein the reaction temperature is 100° to 150°C.

* * * * *